(12) United States Patent
Culf

(10) Patent No.: US 8,505,414 B2
(45) Date of Patent: Aug. 13, 2013

(54) METHOD OF MANUFACTURING A BLADE

(75) Inventor: Peter Geoffrey Culf, Rotherham (GB)

(73) Assignee: Stanley Black & Decker, Inc., New Britain, CT (US)

(*) Notice: Subject to any disclaimer, the term of this patent is extended or adjusted under 35 U.S.C. 154(b) by 389 days.

(21) Appl. No.: 12/486,529

(22) Filed: Jun. 17, 2009

(65) Prior Publication Data

US 2009/0314136 A1    Dec. 24, 2009

Related U.S. Application Data

(60) Provisional application No. 61/074,875, filed on Jun. 23, 2008.

(51) Int. Cl.
*B21K 11/00* (2006.01)

(52) U.S. Cl.
USPC ................ 76/101.1; 76/104.1; 76/DIG. 8

(58) Field of Classification Search
USPC ............ 76/101.1, 104.1, DIG. 8; 30/346.53, 30/346.54; 451/45, 54
See application file for complete search history.

(56) References Cited

U.S. PATENT DOCUMENTS

| | | |
|---|---|---|
| 1,639,335 A | 8/1927 | Gaisman |
| 1,821,578 A | 9/1931 | Povalski |
| 1,823,976 A | 9/1931 | Gaisman |
| 1,849,919 A | 3/1932 | Gaisman |
| 1,855,478 A | 4/1932 | Gaisman |
| 2,032,963 A | 3/1936 | Voltmann |
| 2,073,501 A | 3/1937 | Stargardter |
| 2,073,502 A | 3/1937 | Stargardter |
| 2,131,505 A | 9/1938 | Garsson |
| 2,137,817 A | 11/1938 | Tuerff |
| 2,244,053 A | 6/1941 | Comstock |
| 2,326,774 A | 8/1943 | Freedman |
| 2,964,420 A | 12/1960 | Poorman et al. |
| 3,283,117 A | 11/1966 | Holmes et al. ............. 219/76.16 |
| 3,471,385 A | 10/1969 | Farrell |
| 3,480,483 A | 11/1969 | Wilkinson |
| 3,490,314 A | 1/1970 | Calnan ........................ 76/104.1 |
| 3,496,973 A | 2/1970 | Ballard |
| 3,652,342 A | 3/1972 | Fischbein et al. |
| 3,664,884 A | 5/1972 | Underwood |
| 3,743,551 A | 7/1973 | Sanderson |

(Continued)

FOREIGN PATENT DOCUMENTS

| | | |
|---|---|---|
| AU | 2009202494 A1 * | 1/2010 |
| CA | 2161031 | 4/1996 |

(Continued)

OTHER PUBLICATIONS

Extended European Search Report as issued for EP Patent Application No. 09163418.8, dated Jan. 14, 2010.

(Continued)

*Primary Examiner* — Jason Daniel Prone

(74) *Attorney, Agent, or Firm* — Pillsbury Winthrop Shaw Pittman LLP

(57) ABSTRACT

A method of manufacturing a blade of a cutting tool, the method including depositing a mixture including a hard material onto an edge of a movable steel strip to form a hard material coated steel strip; grinding the edge of the hard material coated steel strip; and subsequently to grinding, forming individual blades from the hard material coated steel strip.

21 Claims, 7 Drawing Sheets

(56) References Cited

U.S. PATENT DOCUMENTS

| | | | |
|---|---|---|---|
| 3,751,283 A | 8/1973 | Dawson | 117/22 |
| 3,754,329 A | 8/1973 | Lane | |
| 3,916,523 A | 11/1975 | Lane et al. | |
| 4,004,042 A | 1/1977 | Fairbairn | 427/34 |
| 4,015,100 A | 3/1977 | Gnanamuthu et al. | 219/121 LM |
| RE29,815 E | 10/1978 | Gnanamuthu | 219/121 LM |
| 4,269,868 A | 5/1981 | Livsey | 427/53.1 |
| 4,299,860 A | 11/1981 | Schaefer et al. | 427/53.1 |
| 4,300,474 A | 11/1981 | Livsey | 118/641 |
| 4,323,756 A | 4/1982 | Brown et al. | 219/121 LF |
| 4,488,882 A | 12/1984 | Dausinger et al. | 51/295 |
| 4,533,812 A | 8/1985 | Lorenz | 219/121 LH |
| 4,547,649 A | 10/1985 | Butt et al. | |
| 4,600,599 A | 7/1986 | Wallsten | |
| 4,644,127 A | 2/1987 | La Rocca | 219/121 FS |
| 4,653,373 A | 3/1987 | Gerber | |
| 4,720,621 A | 1/1988 | Langen | |
| 4,724,299 A | 2/1988 | Hammeke | 219/121 L |
| 4,981,756 A | 1/1991 | Rhandhawa | |
| 5,066,553 A | 11/1991 | Yoshimura et al. | 428/698 |
| 5,204,167 A | 4/1993 | Saijo et al. | 428/212 |
| 5,295,305 A | 3/1994 | Hahn et al. | |
| 5,304,771 A | 4/1994 | Griffin et al. | 219/121.63 |
| 5,368,947 A | 11/1994 | Denney | 428/553 |
| 5,418,350 A | 5/1995 | Freneaux et al. | 219/121.84 |
| 5,449,536 A | 9/1995 | Funkhouser et al. | 427/597 |
| 5,453,329 A | 9/1995 | Everett et al. | 428/565 |
| 5,476,531 A | 12/1995 | Timm et al. | |
| 5,477,026 A | 12/1995 | Buongiorno | 219/121.84 |
| 5,477,616 A | 12/1995 | Williams et al. | |
| 5,486,676 A | 1/1996 | Aleshin | 219/121.63 |
| 5,543,183 A | 8/1996 | Streckert et al. | |
| 5,620,754 A | 4/1997 | Turchan et al. | 427/554 |
| 5,709,907 A | 1/1998 | Battaglia et al. | 427/126.1 |
| 5,724,868 A | 3/1998 | Knudsen et al. | 76/104.1 |
| 5,731,046 A | 3/1998 | Mistry et al. | 427/553 |
| 5,736,709 A | 4/1998 | Neiheisel | |
| 5,837,960 A | 11/1998 | Lewis et al. | 219/121.63 |
| 5,906,053 A | 5/1999 | Turner et al. | 30/347 |
| 6,083,570 A | 7/2000 | Lemelson et al. | 427/554 |
| 6,109,138 A | 8/2000 | Upton | |
| 6,146,476 A | 11/2000 | Boyer | 148/525 |
| 6,293,020 B1 | 9/2001 | Julien | |
| 6,316,065 B1 | 11/2001 | Wallmann | 427/596 |
| 6,396,025 B1 | 5/2002 | Pyritz et al. | 219/121.63 |
| 6,497,772 B1 | 12/2002 | Meckel et al. | 148/254 |
| 6,534,745 B1 | 3/2003 | Lowney | 219/121.84 |
| 6,612,204 B1 | 9/2003 | Droese et al. | 76/104.1 |
| 6,617,271 B1 | 9/2003 | Kodash et al. | |
| 6,623,876 B1 | 9/2003 | Caron | 428/698 |
| 6,701,627 B2 * | 3/2004 | Korb et al. | 76/104.1 |
| 6,756,561 B2 | 6/2004 | McGregor et al. | 219/121.64 |
| 6,857,255 B1 | 2/2005 | Wilkey et al. | |
| 6,881,919 B2 | 4/2005 | Pyritz et al. | 219/76.1 |
| 6,995,334 B1 | 2/2006 | Kovacevic et al. | 219/121.63 |
| 6,995,335 B2 | 2/2006 | Wessner | |
| 7,060,367 B2 | 6/2006 | Yamada et al. | 428/634 |
| 7,111,376 B2 | 9/2006 | Lombardi et al. | |
| 7,139,633 B2 | 11/2006 | Mazumder et al. | 700/123 |
| 7,140,113 B2 | 11/2006 | King et al. | 30/346.54 |
| 7,259,353 B2 | 8/2007 | Guo | 219/121.63 |
| 7,284,461 B2 | 10/2007 | Skrobis et al. | |
| 7,658,129 B2 * | 2/2010 | Korb et al. | 76/104.1 |
| 7,673,541 B2 | 3/2010 | Skrobis et al. | |
| 7,712,222 B2 * | 5/2010 | Korb et al. | 30/346.53 |
| 2003/0019332 A1 * | 1/2003 | Korb et al. | 76/104.1 |
| 2003/0070305 A1 | 4/2003 | Oshika et al. | 30/350 |
| 2004/0244539 A1 | 12/2004 | Korb et al. | 76/104.1 |
| 2005/0040147 A1 | 2/2005 | Hoebel et al. | 219/121.64 |
| 2005/0056628 A1 | 3/2005 | Hu | 219/121.84 |
| 2006/0032840 A1 | 2/2006 | Bagavath-Singh | 219/121.64 |
| 2006/0049153 A1 | 3/2006 | Cahoon et al. | 219/121.63 |
| 2006/0081571 A1 | 4/2006 | Hoebel et al. | 219/121.64 |
| 2006/0242844 A1 | 11/2006 | Skrobis et al. | |
| 2006/0257689 A1 | 11/2006 | Sottke et al. | 428/698 |
| 2006/0266740 A1 | 11/2006 | Sato et al. | 219/121.63 |
| 2007/0006683 A1 * | 1/2007 | Howells | 76/104.1 |
| 2007/0042205 A1 | 2/2007 | Hultin Stigenberg et al. | 428/472 |
| 2007/0131060 A1 | 6/2007 | Kelsey et al. | |
| 2007/0163128 A1 | 7/2007 | Tarrerias | 30/350 |
| 2007/0261867 A1 | 11/2007 | Techel et al. | 172/811 |
| 2008/0178476 A1 | 7/2008 | Luttgens | |
| 2008/0189957 A1 | 8/2008 | Kasper | |
| 2008/0189959 A1 | 8/2008 | Howells | |
| 2010/0043232 A1 | 2/2010 | Skrobis et al. | |
| 2010/0263491 A1 * | 10/2010 | Korb et al. | 76/104.1 |
| 2011/0078909 A1 | 4/2011 | Lambert | |

FOREIGN PATENT DOCUMENTS

| | | |
|---|---|---|
| DE | 1553843 | 1/1971 |
| DE | 1553701.6 | 4/1971 |
| DE | 1553699.9 | 6/1971 |
| DE | 4012279.4 | 10/1991 |
| DE | 19829496.4 | 1/2000 |
| DE | 102004059260.8 | 3/2006 |
| EP | 0758026 | 2/1997 |
| EP | 1 287 953 | 3/2003 |
| EP | 1 454 705 | 9/2004 |
| EP | 1 761 369 | 3/2007 |
| EP | 1 838 504 | 10/2007 |
| EP | 1 953 004 | 8/2008 |
| EP | 1 965 957 | 9/2008 |
| EP | 2138263 A2 * | 12/2009 |
| FR | 2534494 | 4/1984 |
| GB | 1149781 | 4/1969 |
| GB | 1165980 | 10/1969 |
| JP | 58-177238 | 10/1983 |
| JP | 63-220988 | 9/1988 |
| JP | 2001-322022 | 11/2001 |
| JP | 2004-082493 | 3/2004 |
| JP | 4204293 | 1/2009 |
| JP | 2010000596 A * | 1/2010 |
| WO | WO 92/19424 | 11/1992 |
| WO | WO 01/02118 | 1/2001 |
| WO | WO 02/079540 | 10/2002 |
| WO | WO 03/000457 | 1/2003 |
| WO | WO 2006/065624 | 6/2006 |
| WO | WO 2007/049064 | 5/2007 |
| WO | WO 2010/034891 | 4/2010 |

OTHER PUBLICATIONS

Partial European Search Report as issued for EP Patent Application No. 09163418.8, dated Nov. 5, 2009.

Extended European Search Report, including the Search Opinion, as issued for European Patent Application No. 11192478.3, dated Mar. 16, 2012.

Extended Search Report, including the European Search Opinion, as issued for European Patent Application No. 11180705.3, dated Jan. 23, 2012.

* cited by examiner

METHOD OF MANUFACTURING A BLADE

CROSS REFERENCE TO RELATED APPLICATIONS

This application claims priority and benefit under 35 U.S.C. §119(e) to U.S. Provisional Patent Application No. 61/074,875, entitled "Cutting Tool Edge and Method", filed on Jun. 23, 2008, the contents of which are incorporated herein in their entirety by reference.

FIELD

The invention relates to a method of manufacturing a blade of a cutting tool.

BACKGROUND

The use of tungsten carbide as cutting material is well known in the art. Tungsten carbide is used extensively in various cutting, drilling, milling and other abrasive operations due to its high abrasion resistant properties. Conventional cutting tools like power saw blades have tungsten carbide inserts brazed onto the blade teeth. This makes the actual cutting surface extremely hard and durable. However, brazing is not a suitable process for mounting tungsten carbide inserts on many cutting tools, such as utility knife blades, chisels and plane irons.

SUMMARY

One aspect of the invention involves a method of manufacturing a blade having a hard coating deposited on its edge. The method includes depositing a hard material, e.g. tungsten carbide, onto the edge of a cutting tool and then sharpening the edge such that the surface is entirely made of the hard material, e.g. tungsten carbide, after sharpening.

In an aspect of the invention, there is provided a method of manufacturing a blade of a cutting tool, the method including depositing a mixture including a hard material, e.g. tungsten carbide, onto an edge of a movable steel strip to form a hard material (e.g. tungsten carbide) coated steel strip; grinding the edge of the hard material (e.g. tungsten carbide) coated steel strip; and forming individual blades from the hard material (e.g. tungsten carbide) coated steel strip.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
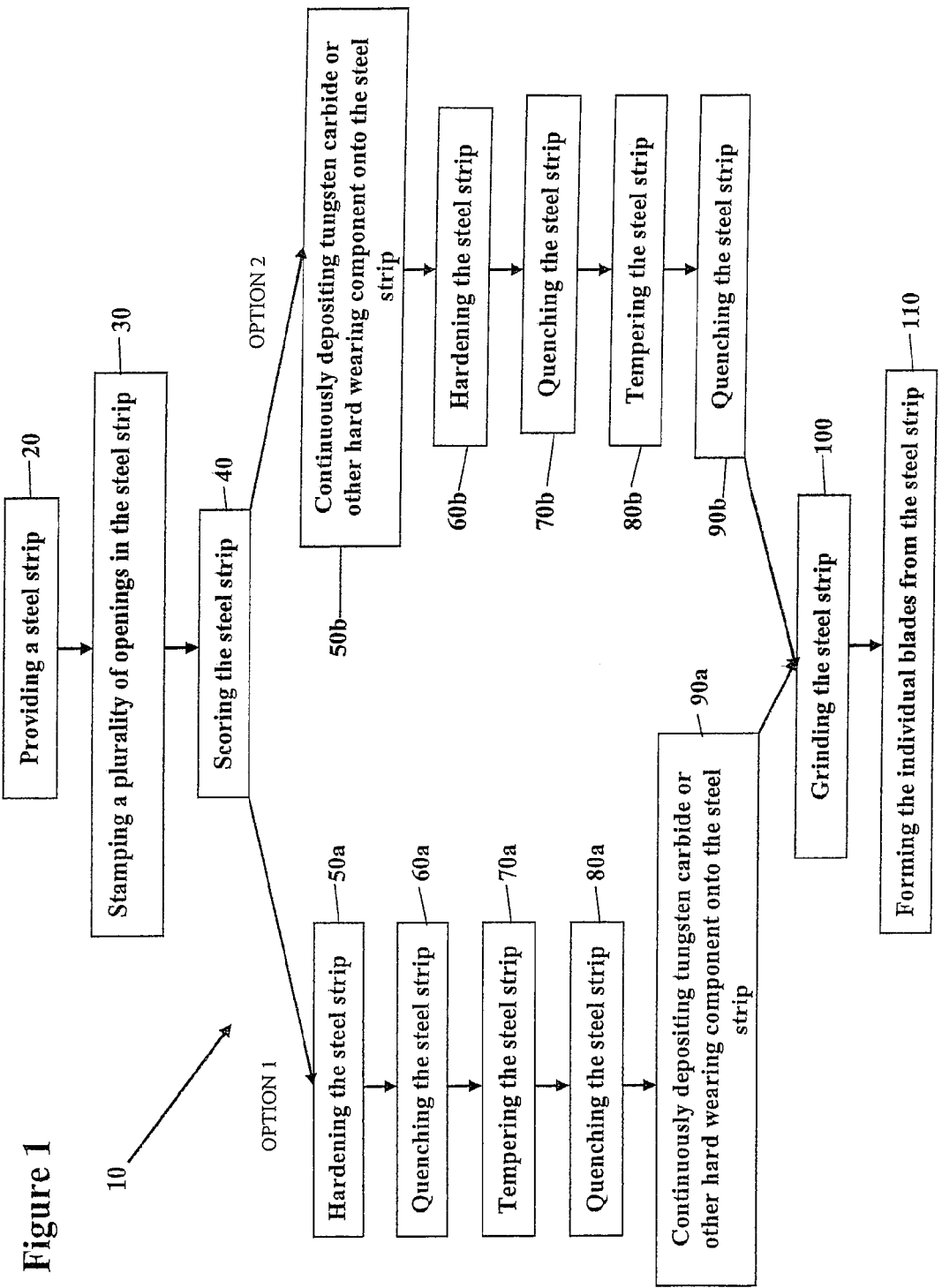
FIG. 1 shows a flowchart for manufacturing a blade of a cutting tool in accordance with an embodiment of the invention.

FIG. 1 is flow chart of a process of manufacturing a blade according to an embodiment of the present invention. In the process 10 of manufacturing a blade, a strip of steel blade stock material, from which a plurality of blades are produced, is provided at step 20. In one embodiment, the steel is provided in a coil form, for example, to render the strip more compact to facilitate handling. In an embodiment of the invention, the steel material is a high carbon steel such as, for example, steel grade C1095 or a low alloy steel (e.g. AISI 4147), although it is contemplated that other types of materials could be used in other embodiments of the invention. The length of the strip in the coil can be as long as 1 km or more. The strip may also be provided in a multiple coils configuration, the multiple coils being welded end to end. The dimension of the strip can be selected according to desired dimensions of the blade. For example, the strip can have a width of 19 mm and a thickness of 0.6 mm. However, the strip can have other dimensions depending on the intended use of the blade that would be formed from the steel strip. In an embodiment of the invention, the steel strip is provided with a maximum hardness of about 300 HV.

Figure 2:
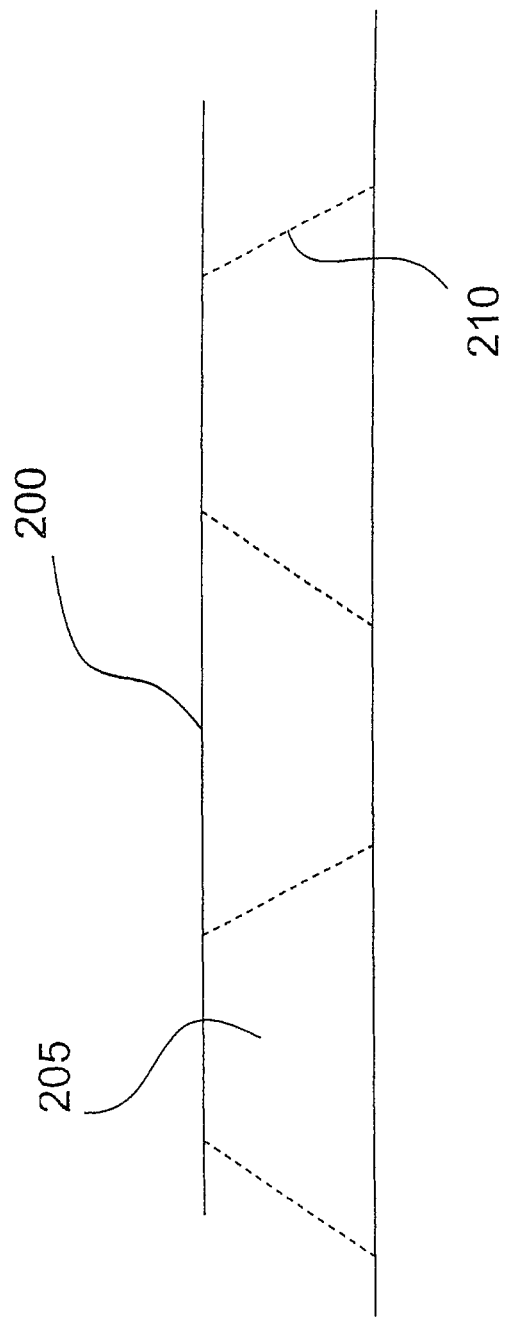
FIG. 2 shows a steel strip in accordance with an embodiment of the invention.

At step 30, the steel strip material is delivered to a punch press where a plurality of openings are stamped into the strip to define attachment points employed to retain the blade in a cartridge or onto a blade carrier for utility knife. In addition, a brand name, logo or other indicia may also be stamped thereon. The steel strip is then scored at step 40 to form a plurality of axially spaced score lines, wherein each score line corresponds to a side edge of a respective blade and defines a breaking line for later snapping or cutting the scored strip into a plurality of blades. FIG. 2 is a schematic representation of a portion of the steel strip 200 that shows the score lines 210. The score lines define individual blades 205 that have a trapezoid shape. Other forms and shapes such as parallelogram blades, hook blades, etc. may also be obtained with a selection of an appropriate scoring configuration.

In one embodiment, the scoring and piercing procedures of steps 30 and 40 can be combined into a single stamping operation.

After scoring and piercing the steel strip, various options can be pursued for manufacturing the blade. For example, one option ("Option 1") includes hardening the steel strip prior to depositing a hard material (e.g. tungsten carbide) and is represented by steps 50*a*-90*a* in FIG. 1. Another option ("Option 2") includes depositing a hard material (e.g. tungsten carbide) prior to hardening the steel strip and is represented by steps 50*b*-90*b*. Options 1 and 2 will be described in more detail hereinafter.

Option 1:

The coil of pressed steel strip of blade stock is then fed at step 50*a* through a heat treatment line to harden the steel strip material. In this process, the steel is run off of the coil and passed through a hardening furnace which heats the steel to a temperature above a transition temperature. The transition temperature is the temperature at which the structure of the steel changes from a body centred cubic structure, which is stable at room temperature, to a face centred cubic structure known as austenite (austenitic structure), which is stable at elevated temperatures, i.e. above the transition temperature. The transition temperature varies depending on the steel material used. In an embodiment of the invention, the heating to harden the steel strip is performed at a temperature between about 800° C. and 900° C. For example, for a grade C1095 steel, the transition temperature is approximately 820° C. (approximately 1508 F). In this instance, the heating to harden the steel strip is performed at a temperature above approximately 820° C.

In an embodiment of the invention, the length of the hardening/heating furnace is approximately 26 feet (approximately 8 meters). The steel strip travels at a speed approximately between 16 and 22 feet per minute (approximately between 5 and 7 meters per minute). A controlled atmosphere of, for example, "cracked ammonia," which contains essentially nitrogen and hydrogen, is provided in the furnace to prevent oxidation and discoloration of the steel strip. Although cracked ammonia may be used to prevent oxidation and discoloration other gases may be used, such as but not limited to, "a scrubbed endothermic gas" or "molecular sieved exothermic gas."

In an embodiment of the invention, the heating of the steel strip to harden the steel strip is performed for a time period between about 75 and 105 seconds.

After exiting the heating (hardening) furnace, at step 60*a*, the heat hardened steel strip is quenched. In an embodiment of the invention, the hardened steel strip is passed between liquid cooled conductive blocks disposed above and below the steel strip to quench the steel strip. In an embodiment of the invention, the heat hardened steel strip is passed through water-cooled brass blocks with carbide wear strips in contact with the steel strip to quench the steel. The brass blocks cool the steel strip from the hardening temperature, for example (approximately 820° C.), to ambient temperature (approximately 25° C.) at a speed above a critical rate of cooling. The critical rate of cooling is a rate at which the steel is cooled in order to ensure that the austenitic structure is transformed to martensitic structure. A martensitic structure is a body centred tetragonal structure. In the martensitic structure, the steel is highly stressed internally. This internal stress is responsible for the phenomenon known as hardening of the steel. After hardening, the hardness of the steel which was originally less than approximately 300 HV (before heat treatment) becomes approximately 850 HV (approximately 63 HRC). In an embodiment of the invention, the quenching of the steel strip is performed for about 2 to 4 seconds. In another embodiment of the invention, a gas or a liquid is used to quench the steel strip.

At step 70*a*, the hardened steel strip then passes through a tempering furnace which heats the steel to a temperature between 150° C. and 400° C. This process improves the toughness of the blade and reduces the blade hardness to HRc 62 to 55, depending on the tempering temperature selected.

In an embodiment of the invention, the length of the tempering furnace is approximately 26 feet (approximately 8 meters). The steel strip travels at a speed approximately between 16 and 22 feet per minute (approximately between 5 and 7 meters per minute). A controlled atmosphere of, for example, "cracked ammonia", which contains essentially nitrogen and hydrogen, is provided in the furnace to prevent oxidation and discoloration of the strip. Although cracked ammonia may be used to prevent oxidation and discoloration other gases may be used, such as but not limited to a "scrubbed endothermic gas" or "molecular sieved exothermic gas". In the embodiment of the invention, the heating of the strip to temper the strip is performed for a time period between about 75 and 105 seconds.

After exiting the heating (tempering) furnace, at step 80*a*, the hardened and tempered steel strip is quenched. In an embodiment of the invention, the hardened and tempered steel strip is passed between liquid cooled conductive quench blocks disposed above and below the steel strip to quench the steel strip. In an embodiment of the invention, the heat hardened and tempered steel strip is passed through water-cooled brass blocks with carbide wear strips in contact with the steel strip to quench the steel. The brass blocks cool the steel strip from the tempering temperature, for example (approximately 150° C. to 400° C.), to ambient temperature (approximately 25° C.) at a speed above a critical rate of cooling to prevent oxidation of the steel surface.

The coil of quenched steel strip is then continuously fed at step 90*a* to a hard material (e.g. tungsten carbide) deposition station that is configured to apply a coating of hard material (e.g. tungsten carbide) to an edge of the steel strip. The hard material has a hardness that is significantly greater than the steel strip. In one embodiment of the invention, the hardness of the hard material is at least 60 Rc. In one embodiment of the invention, the hardness of the hard material is in a range from about 70 to 80 Rc.

Figure 3:
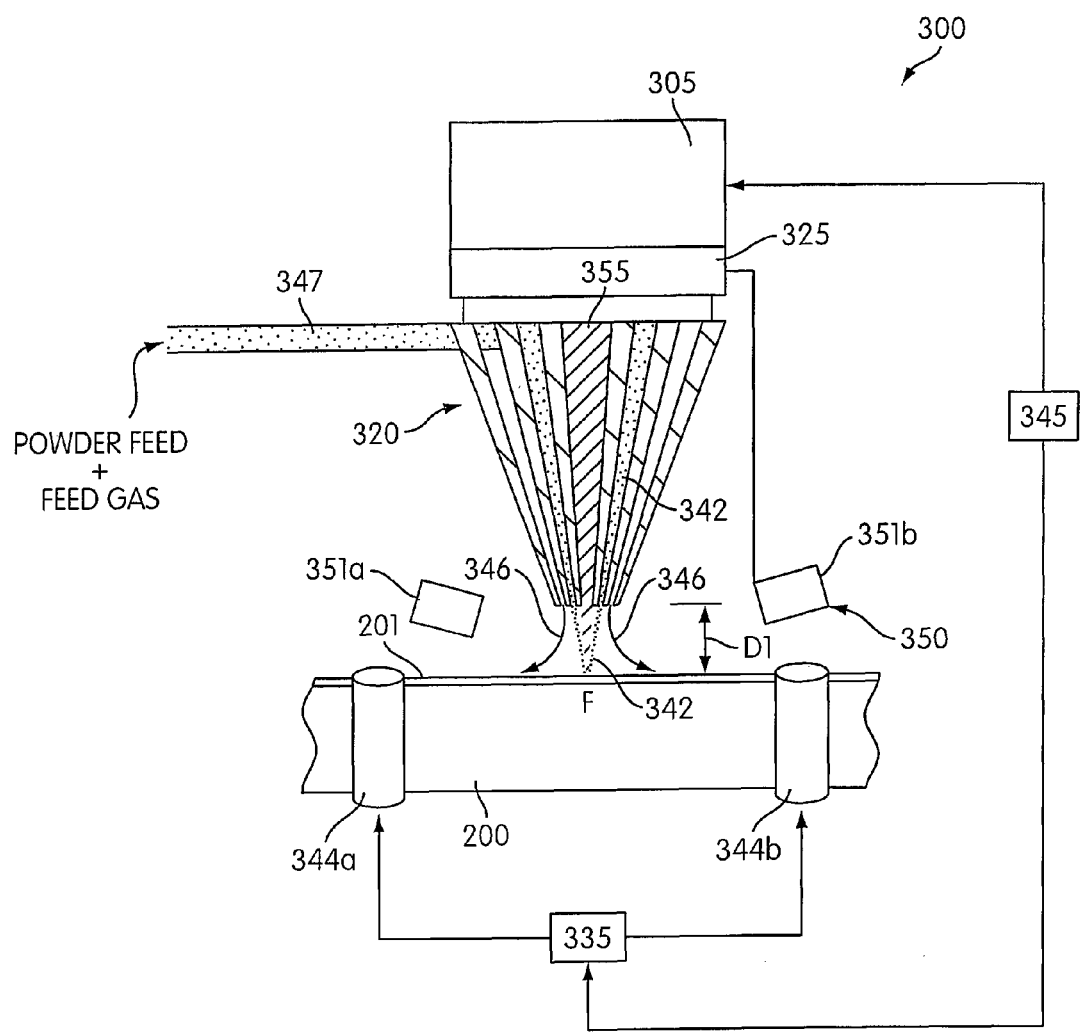
FIG. 3 shows a deposition station configured to deposit a hard metal (e.g. tungsten carbide) on an edge of a steel strip in accordance with an embodiment of the invention.

Referring now more particularly to FIG. 3, this figure is a schematic representation of a deposition station, generally indicated at 300, for depositing a coating of hard material, e.g. tungsten carbide, onto an edge 201 of the moving steel strip 200, in accordance with an embodiment of the invention. The deposition station 300 includes a radiation source 305 configured to provide a beam of radiation 355 onto the steel strip 200. The deposition station 300 further includes a projection system 325 configured to project and focus the beam of radiation 355 onto a target portion of the steel strip 200.

Option 2:

In another embodiment, the deposition of the hard material (e.g. tungsten carbide/binder) powder takes place (step 50*b*) before the steel strip is hardened and tempered. The hardening and tempering operations are shown in steps 60*b*-90*b* and are substantially similar to those of steps 50*a*-80*a*. Specifically, after depositing the hard material (e.g. tungsten carbide), the steel strip is hardened at step 60*b* and quenched at step 70*b*. Then, the steel strip is tempered at step 80*b* and quenched at step 90*b*.

Referring back to FIG. 3, the radiation source 305 is configured to output a radiation beam with sufficient power and energy to melt the steel strip 200. In one embodiment, the radiation source is a laser that outputs a beam of radiation in the infra-red (IR) range, with a wavelength of a few micrometers. An example of an IR laser that may be used is a $CO_2$ laser with the principal wavelength bands centering around 9.4 and 10.6 micrometers. The power of the $CO_2$ laser may be in the range of about a few kWatts, for example between 1 and 8 kWatts. In one embodiment, the power of the $CO_2$ laser is about 6 kWatts. Alternatively, a laser operating in the ultraviolet (UV) range could also be used in another embodiment of the invention such as, for example, a UV laser with a wavelength lower than 400 nm. Examples of UV lasers include excimer lasers.

It will be appreciated that the source of radiation 305 is not limited to a light source. For example, in an embodiment of the invention, an electron beam source may also be used in the deposition station 300. In this implementation, the electron beam source is configured to provide a beam of electrons with sufficient energy and power to melt the steel strip 200.

The beam of radiation 355 outputted by the radiation source 305 is directed to a projection system 325 that is configured to focus the beam onto the edge of the moving steel strip 200. The energy of the projected beam 355 that is concentrated on the edge 201 of the steel strip 200 is used to melt the target portion of the steel strip, and when used, the binder within the feed powder 342. The projection system 325 may include various types of optical components, such as refractive, reflective, magnetic, electromagnetic, electrostatic or other types of optical components, or any combination thereof, to direct, shape, or control the radiation. In the event the radiation source is an electron beam source, electromagnetic lenses may be used to control and focus the beam 355.

It will be appreciated that the projection system 325 may be integral with the radiation source 305. The projection system 325 is preferably mounted to a frame that is stationary, although it is contemplated that one or more optical elements of the projection system 325 may be movable to control the shape of the projected radiation beam 355.

A dispenser or deposition head 320, arranged between the radiation source 305 and the steel strip 200, is configured to supply a mixture 342 of hard material (e.g. tungsten carbide) and a binder element to the thin edge 201 of the steel strip 200. The dispenser 320 has a generally hollow shape to allow the beam of radiation 355 to pass there-through.

Figure 4:
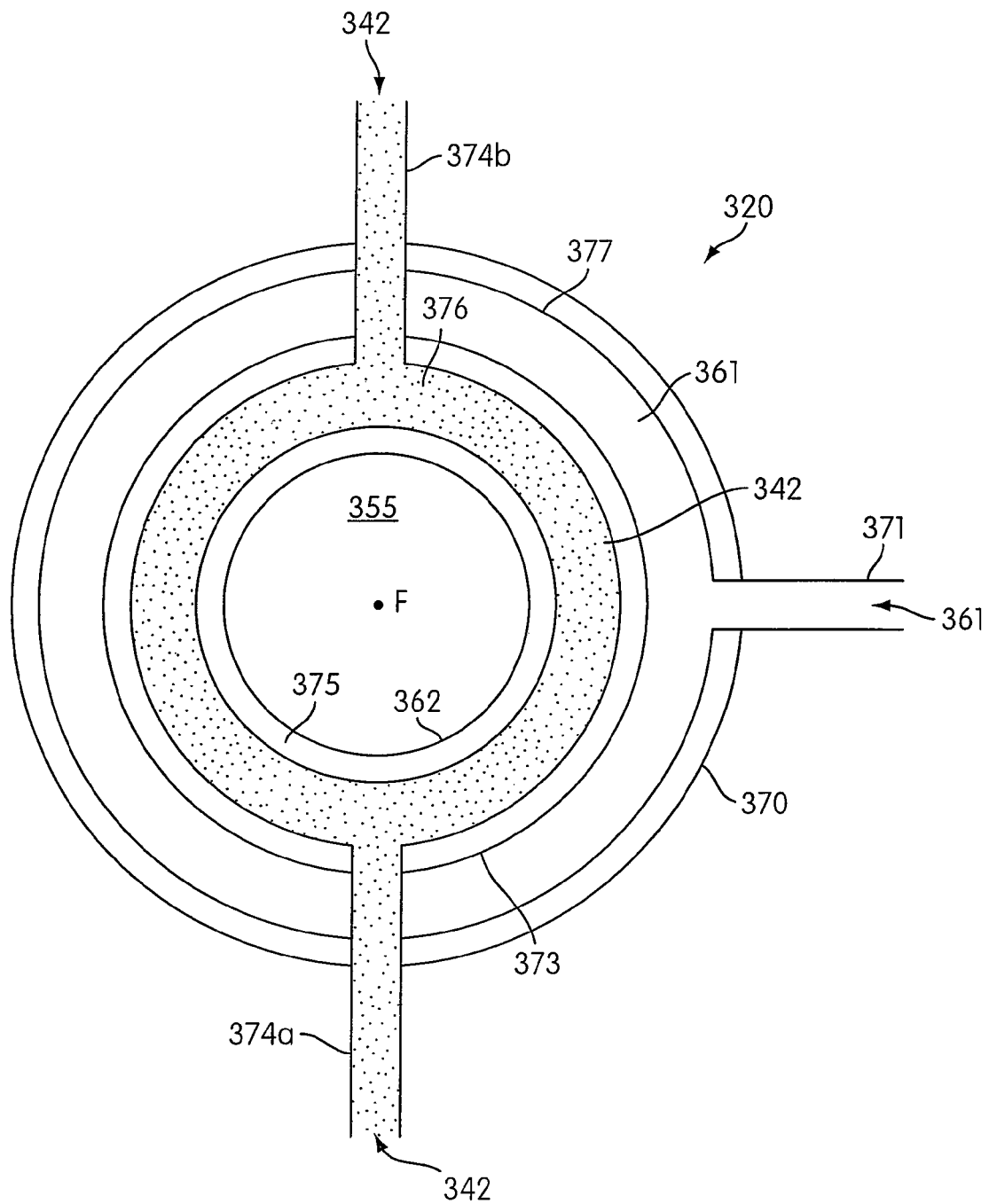
FIG. 4 shows a dispenser for use in the apparatus of FIG. 3 in accordance with an embodiment of the invention.

FIG. 4 shows a top view of the dispenser 320 in accordance with an embodiment of the invention. The dispenser 320 has a generally conical annular shape, although it is contemplated that other shapes (e.g. square, rectangular, oval, polygonal) could be used to dispense the mixture 342. The dispenser 320 includes a series of conical annular cavities designed to deliver the powder 342, inert shield gas 361 and laser beam to a single focus point F. In an embodiment of this invention, the shielding gas 361 is Argon. As shown in FIG. 4, the dispenser 320 includes an outer cone 370 and a gas inlet 371 through which the inert shield gas 361 is supplied. The dispenser 370 further includes an inner cone 373 and inlets 374a-b through which the mixture 342 is supplied. A central cone 375 defines a passage in the dispenser 320 to allow the projected radiation beam 355 to pass therethrough. The inner cone 373 is arranged between the central cone 375 and the outer cone 370 and defines a channel 376. The inner cone 373 and the outer cone 370 define a channel 377 therebetween to allow the inert shield gas 361 to flow therethrough. It will be appreciated that other arrangements are contemplated. It will also be appreciated that additional or fewer channels may be used to supply the mixture 342 to the steel strip 200.

The diameter of the periphery 362 of the central corn 375 is selected along with the distance D1 separating the dispenser 320 from the steel strip 200 and the length of the channel 376 such that the particles of the mixture 342 fall under the action of gravity onto a predetermined portion of the steel strip 200. In addition, or alternatively, the powder is placed into a hopper feed system, and the powder is stripped from the hopper and propelled through a plastic tube by a compressed gas (such as argon or helium). Such predetermined portion generally corresponds to the point of focus F of the beam of radiation 355 onto the steel strip 200. The diameter of the inner periphery 362 is also selected in order to allow the radiation beam 355 to pass through the dispenser 320.

The inner shield gas 361 is configured to form a shield 346 around the mixture 342 at a location near the point of focus F, as shown in FIG. 3. The shield 346 provides a protective atmosphere during deposition of the mixture 342 of hard material (e.g. tungsten carbide) in order to prevent oxidation of the steel strip 200. During use of the deposition station 300, the inner shield gas 361 is flushed from the inlet 371 down the channel 377 to the steel strip in a manner that is such that the environment around the melted portion of the steel strip 200 is non-oxidizing.

The dispenser 320 is fixedly mounted to a frame (not shown) of deposition station 300 and may be either stationary or moveable in at least three directions, e.g. x, y and z directions. A benefit of having a moveable dispenser 320 is that the position of the dispenser 320 relative to the steel strip 200 can be accurately controlled. Various motors and actuators, such as electric, electromagnetic and/or piezoelectric actuators, could be used to displace the dispenser 320.

Supply of the mixture 342 to the dispenser 320 is effected via the plurality of inlets 374a-b. In one implementation, a container (not shown) is used to store the particles of mixture 342. The container is arranged to communicate with the plurality of inlets 374a-b via one or more conduits 347 such that the mixture is conveyed to the predetermined portion of the steel strip 200 via the channel 376 under the action of gravity. In one embodiment of the invention, it is envisioned that the supply of the mixture 342 be mechanically assisted with, for example, a compressed gas as noted above or a mechanical pusher.

Figure 5:
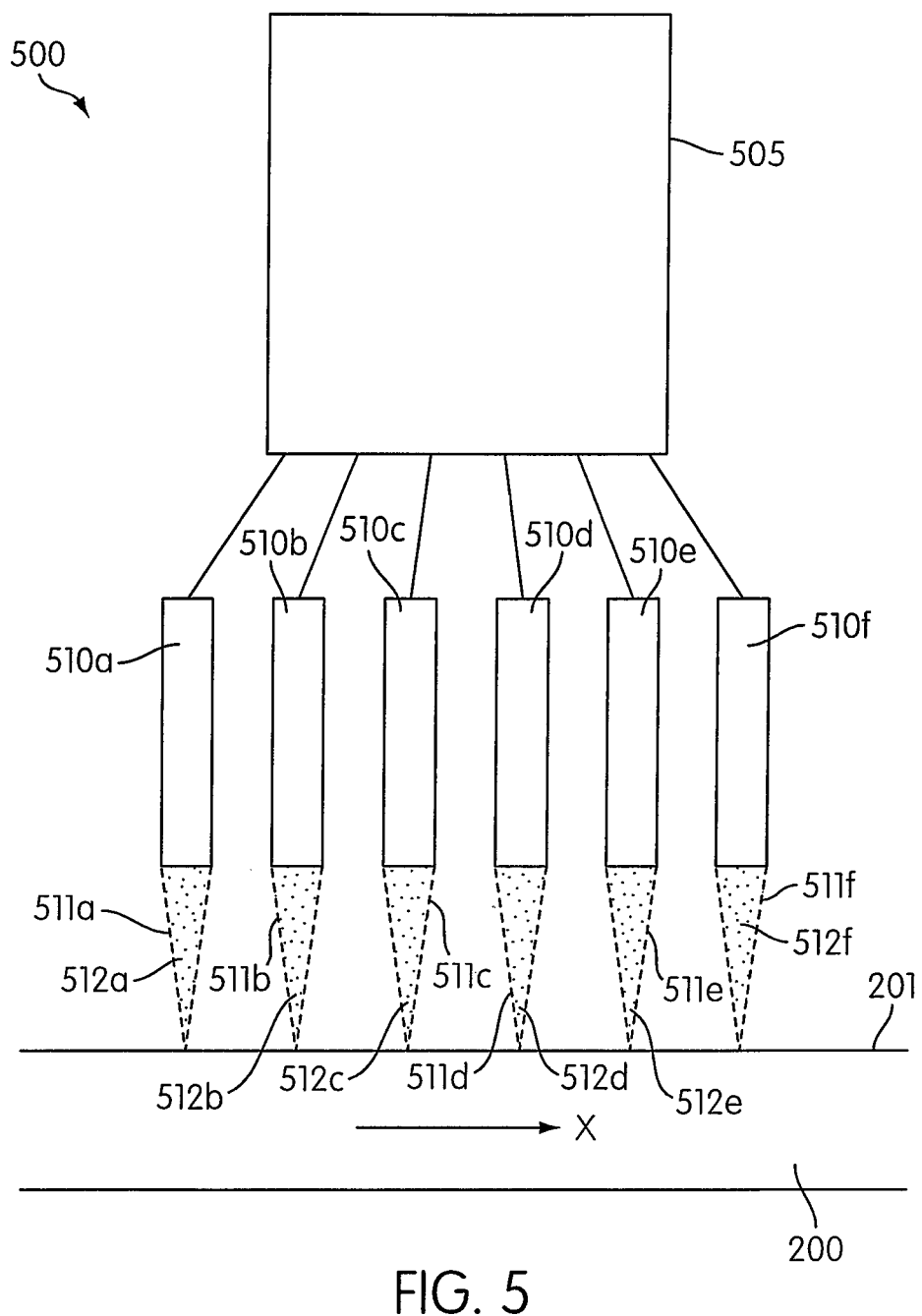
FIG. 5 shows a deposition station configured to deposit a hard metal (e.g. tungsten carbide) on an edge of a steel strip in accordance with an embodiment of the invention.

It will be appreciated that alternative arrangements of the dispenser 320 could be used in other embodiments of the invention. For example, instead of using an annular shaped dispenser, one or more individual nozzles or deposition heads may be used to supply the particles to thin edge 201 of the steel strip 200. This configuration is shown in FIG. 5. As shown in FIG. 5, a single power source 505 may be used in conjunction with individual deposition heads or dispensers 510a-f. Each individual deposition head 510a-f may be similar to the deposition head 320 shown in FIGS. 3-4. The radiation beam (e.g. laser beam) provided by the power source 505 is directed to the individual deposition heads 510a-f such that each deposition head supplies its own radiation beam 511a-f on the thin edge 201 of the steel strip 200. Power is individually controlled for each deposition head. Further, each deposition head is configured to individually supply its own mixture 512a-f. In the embodiment of FIG. 5, the power source independently supports up to six laser deposition heads. It will be appreciated that additional or fewer deposition heads could be used in an embodiment of the invention. This configuration is greatly beneficial. Indeed, by independently controlling the power to each deposition head, it is possible to better control the shape of the deposited layer and deposit different compositions (e.g. different mixtures of materials or different compositions of the same mixture) at each deposition edge. In that way, it is possible to have multiple depositions from a single coating process without coiling and re-coating the steel strip 200. In operation, the steel strip 200 moves along the x direction such that various layers can be coated on the thin edge 201 by the different deposition heads 20a-f.

As depicted in FIG. 5, the individual heads 510a-f are positioned along the edge of the thin edge 201 of the steel strip 200. However, alternative arrangements are possible. For example, the individual deposition heads may be arranged around the predetermined portion of the steel strip 200 where the beam of radiation is focused (point F). Further, the one or more individual deposition heads may be stationary or moveable relative to the steel strip 200 in a similar manner as the deposition head or dispenser 320 and compressed gas may be used to convey the particles to the steel strip 200.

The dispenser 320 may also include one or more shutters (not shown) to prevent particles of mixture 342 from exiting the nozzles 360 after completing the deposition process. The shutters may be arranged on the inner periphery of the dispenser 320, or within the channels or on the upper portion of the dispenser.

Referring back to FIG. 3, the steel strip 200 may be moved in at least three directions, x, y and z, relative to the beam of radiation 355 with the aid of an actuator 335. As shown in Figure, the movable steel strip 200 is moved under the radiation beam 355 along the x direction with the use of two rollers 344a-b. The two rollers 344a-b can be positioned with the actuator 335. One or more separate motors may be used to move the steel strip 200 in the at least three directions, x, y and z. Examples of actuators that may be used in an embodiment of the invention include electric and electromagnetic actuators. The position of the steel strip 200 may be controlled with the aid of dedicated electronics and servo control systems. To that effect, a measurement system (not shown) may be used to measure the position of the moving steel strip 200 under the radiation-beam 355.

It will be appreciated that deposition of the mixture 342 of hard material (e.g. tungsten carbide) and binder element could be carried out in a less protective environment. In this implementation, oxidation of the steel strip 200 will occur at the locations on the blade where the mixture 342 is deposited. The oxidation could then be mechanically or chemically removed after completing the deposition process. For example, it is contemplated that an in-line polishing process using a wire brushing be applied after deposition of the mixture 342 onto the steel strip 200.

An in-line measurement system 350 may be used to control the characteristics of the deposited mixture 342 onto the blade perform 10. Preferably, the measurement system 350 is a non-destructive optical system, such as an ellipsometer, that controls the quality/composition and thickness of the film mixture 342. The in-line measurement system 350 may include an emitter 351a and a detector 351b. The emitter 351a is configured to illuminate the portions of the steel strip 200 with a radiation beam. The radiation beam is reflected by the steel strip 200 and then detected by the detector 351b. The reflected radiation beam is subsequently analyzed with dedicated instrumentations in order to measure the characteristics of the coating of mixture 342. Preferably, the measurements are performed by the in-line measurement system 350 after completing the deposition process. If the measured characteristics of the steel strip 200 are not within specification, the portion of the steel strip can be marked with a marker to indicate that the final blade should be rejected.

As shown in FIG. 3, a controller 345 is used to control the deposition process. The controller 345 may be operatively connected to the dispenser 320, the radiation source 305 and the actuator 335. The controller 345 may be accessed by an operator to input the illumination settings, control the amount and flow of particles of the mixture 342 in the dispenser 320 and/or the desired positioning of the steel strip 200 during the deposition process. In the configuration where multiple deposition heads or nozzles are used, the operator can input to the controller 345 the desired composition in each deposition head. It will be appreciated that the positioning of the thin edge 201 of the steel strip 200 under the radiation beam 355, the amount of particles of mixture 342 and the illumination settings of the radiation source 305 may substantially change depending on the geometry and nature of the steel strip 200.

Figure 6:
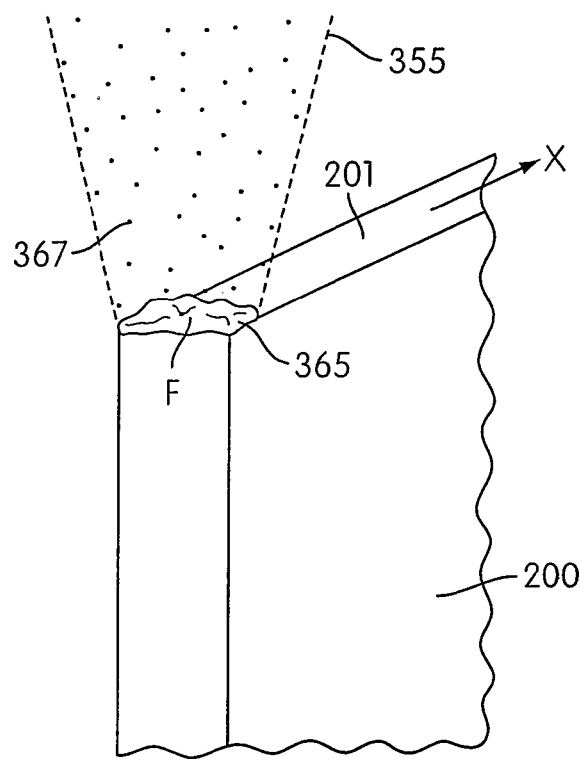
FIG. 6 shows a weld pool formed on a steel strip in accordance with an embodiment of the invention.

In operation, the thin edge 201 of the steel strip 200 is continuously moved under the radiation beam 355. Referring now to FIG. 6, this figure schematically depicts a view of the steel strip 200 during the deposition process. The x-direction represents the direction of movement of the steel strip 200 during deposition. As shown in FIG. 6, irradiation of the thin edge 201 of the steel strip 200 creates a weld pool 365 at the point of focus F of the beam of radiation 355. Particles 367 of the mixture 342 are released by the dispenser 320 and fall freely within the weld pool under the action of gravity. The binder is irradiated and melted by the radiation beam 355 while falling on the steel strip 200. As a result, substantially all the particles 367 are already melted when they reach the weld pool 365.

The binder element is selected to bind the hard material (e.g. tungsten carbide) to the melted material of the weld pool. All bonding between the particles 367 and the steel strip 200 is achieved by solidification of the hard material (e.g. tungsten carbide)/binder element within the weld pool. This results in a void free deposit of hard material (e.g. tungsten carbide)/binder onto the steel strip 200. An example of binder that may be used in an embodiment of the invention includes cobalt. However, this is not limiting. It is contemplated that additional binders could be used in other embodiments of the invention.

The thickness of the deposit is controlled by the particle feed rate, the particle size, the illumination settings of the radiation source (e.g. energy, power, frequency of the radiation pulses) and the rate of passage of the steel strip 200 beneath the focused beam of radiation 355. These parameters are inputted and controlled by the controller 345. The thickness of the deposit is measured by the measurement device 351.

The speed of displacement of the steel strip 200 is controlled such that the thickness of the deposit remains within specification at all times. The speed of the steel strip 200 may vary depending on the characteristics of the beam of radiation (e.g. wavelength and frequency, energy and power of the pulses), the size of the focus spot and the materials constituting the steel strip 200.

Figure 7:
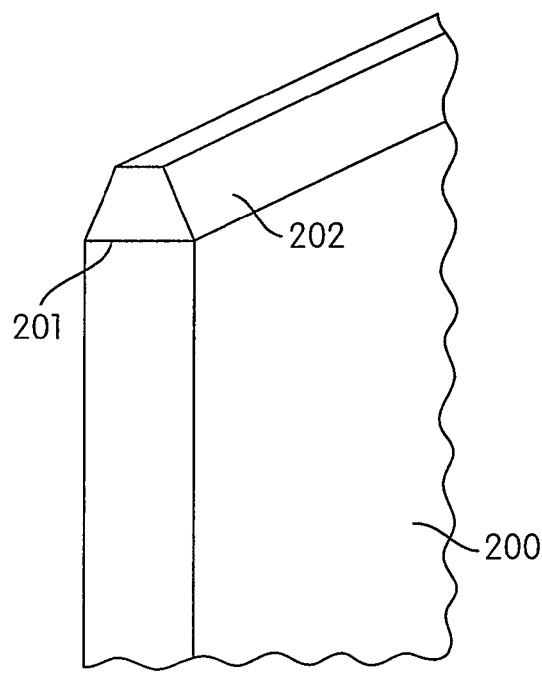
FIG. 7 is a schematic representation of the steel strip after deposition of a hard metal (e.g. tungsten carbide) using a single head or nozzle.
Figure 8:
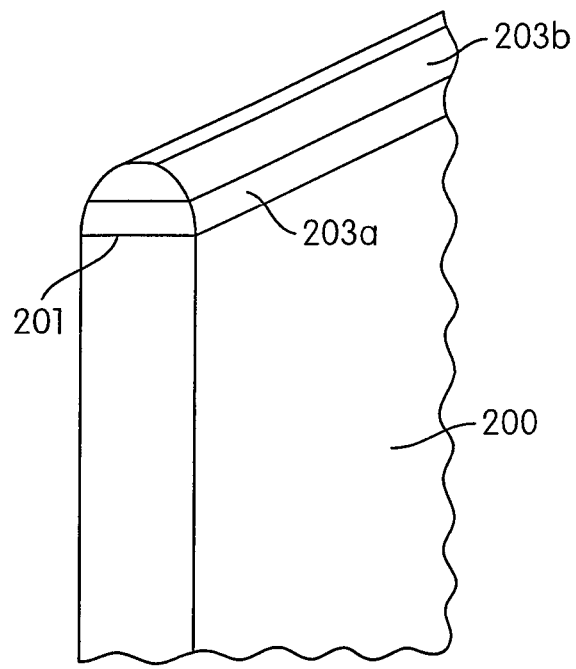
FIG. 8 is a schematic representation of the steel strip after deposition of a hard metal (e.g. tungsten carbide) using multiple deposition heads.

Referring now to FIG. 7, this figure shows a schematic representation of the steel strip 200 after deposition of the mixture 342 using a single head or nozzle. As can be seen in this figure, a single layer 202 of the mixture 342 is coated on the thin edge 201 of the steel strip 200. FIG. 8 shows a schematic representation of the steel strip 200 after deposition of different mixtures using multiple heads or nozzles. In this embodiment, two heads are used and each head is configured to provide a different mixture composition. As shown in FIG. 8, two layers 203a-b are coated on the thin edge 201 of the steel strip 200. It will be appreciated that more than two layers having the same or a different mixture composition could be coated on the thin edge 201. Further, each of the layers may be coated with a different deposition head or nozzle.

It will be appreciated that the deposition of the hard material (e.g. tungsten carbide) could be performed in a similar manner on the opposite side of the blade preform.

Referring back to FIG. 1, after exiting the deposition station 300, the steel strip 200 is delivered to a grinding machine.

Figure 9:
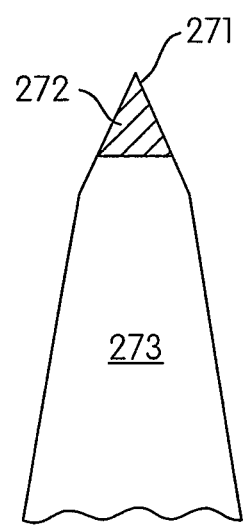
FIG. 9 shows a cross-section of a blade in accordance with an embodiment of the invention.

In an embodiment, at step 100, the steel strip is recoiled and is transferred to a grinding machine for grinding an edge of the strip. A relatively shallow angle, such as between 10 to 32 degrees is ground onto the edge of the strip. This angle is ground on both sides of the blade, so that the blade is generally symmetrical relative to a longitudinal axis of the blade that bisects the edge, as can be appreciated from FIG. 9. In addition, the ground angle is measured relative to the longitudinal axis as can also be appreciated from FIG. 9. The angle is selected to be shallow to reduce the force that may be required to push the blade through the material it is cutting. FIG. 9 shows a cross section of an example of a ground edge of a steel strip, according to an embodiment of the present invention. In this example, the angle of the ground edge 271 of the steel strip 200 is 22°+−2°.

It will be appreciated that the steel strip 200 can be further thermally processed after depositing the hard metal coating at step 90 in accordance with Option 1. For example, in one implementation, the steel strip 200 could be again hardened, quenched and tempered in a similar manner as described at steps, 50a, 60a, 70a and 80a.

In the grinding step, the blade edge may be ground with a single angle or with multiple angles.

Finally, the processed steel strip is snapped along the length of the steel strip at each score line to break the steel strip along the score lines to produce a plurality of blades, at step 110. An example of an embodiment of a blade obtained according to the manufacturing process of the present invention is shown with its various dimensions in FIG. 9.

FIG. 9 shows a cross section of a blade 205 after grinding and sharpening the steel strip 200 The blade 205 includes a cutting edge 271 that is mainly made of a hard material (e.g. tungsten carbide) 272 while the remaining portion of the blade is made of the core material constituting the blade 205, denoted as 273 in FIG. 9. As will be appreciated by one skilled in the art, the deposition of tungsten carbide in accordance with an embodiment of the invention provides a blade that has a surface of tungsten carbide that is flushed with the remaining surface of the blade. As can be seen in FIG. 9, the tungsten carbide is welded to the blade so as to form a seamless transition between the tungsten carbide and the core material 273 of the blade.

While the principles of the invention have been made clear in the illustrative embodiments set forth above, it will be apparent to those skilled in the art that various modifications may be made to the structure, arrangement, proportion, elements, materials, and components used in the practice of the invention.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A method of manufacturing a blade of a cutting tool, the method comprising:
   depositing a mixture including a hard material onto an edge of a movable steel strip to form a hard material coated steel strip;
   grinding the edge of the hard material coated steel strip; and
   subsequently to the grinding, forming individual blades from the hard material coated steel strip,
   wherein, prior to the depositing, the method comprises heating and quenching the movable steel strip to harden the movable steel strip, and
   wherein the hardening of the movable steel strip with the heating is only done prior to the depositing.

2. The method of claim 1, wherein the hard material is tungsten carbide.

3. The method of claim 1, further comprising, prior to the depositing,
   scoring the movable steel strip to form a plurality of spaced scored lines that define the individual blades.

4. The method of claim 1, wherein the depositing includes
   irradiating the movable steel strip with a beam of radiation to melt a portion of the steel strip, and
   supplying the mixture including the hard material and a binder element to the melted portion of the steel strip.

5. The method of claim 4, wherein the beam of radiation is produced by a laser.

6. The method of claim 4, wherein the beam of radiation is an electron beam.

7. The method of claim 4, further comprising cooling the melted portion of the steel strip prior to sharpening the steel strip.

8. The method of claim 4, wherein the binder is a cobalt binder.

9. The method of claim 4, wherein the mixture of hard material and the binder element is supplied to the melted portion of the steel strip during the irradiation.

10. The method of claim 4, wherein the mixture of hard material and the binder element is supplied to the melted portion of the steel strip under the action of a compressed gas.

11. The method of claim 4, wherein a thickness of the hard material deposit on the steel strip is controlled by adjusting a supply rate of the mixture of hard material and the binder element in the melted portion, or a particle size of the mixture of hard material and the binder element, or a speed of relative displacement of the steel strip and the radiation beam, or any combination of the foregoing.

12. The method of claim 11, wherein the thickness of the hard material deposit on the blade perform is lower than about 1 mm.

13. The method of claim 4, wherein the mixture of hard material and the binder element is supplied via a dispenser, the dispenser having an opening through which the radiation beam propagates.

14. The method of claim 13, wherein the dispenser has a substantially annular shape.

15. The method of claim 4, wherein the depositing is performed in a protective atmosphere to prevent oxidation of the blade.

16. The method of claim 15, wherein the protective atmosphere includes nitrogen and/or argon.

17. The method of claim 1, further comprising polishing the steel strip after the grinding to remove any oxide formed on the blade.

18. The method of claim 1, wherein the steel strip is made of carbon steel or low alloy steel.

19. The method of claim 1, the depositing includes
   irradiating the movable steel strip with a plurality of beams of radiation to melt portions of the steel strip, and
   supplying a plurality of mixtures of hard material and a binder element to the melted portions of the steel strip so as to form multiple layers of coated materials.

20. The method of claim 19, wherein the plurality of beams of radiation and the plurality of mixtures are supplied by a plurality of deposition heads.

21. The method of claim 20, wherein the deposition heads are independently controllable.

\* \* \* \* \*